(12) United States Patent
Antraygue

(10) Patent No.: US 9,469,393 B2
(45) Date of Patent: Oct. 18, 2016

(54) DEVICE FOR COMBINING FORCE AMONG CONTROL UNITS, CONTROL UNIT AND AIRCRAFT

(71) Applicant: RATIER FIGEAC, Figeac (FR)

(72) Inventor: Cedric Antraygue, Figeac (FR)

(73) Assignee: RATIER FIGEAC, Figeac (FR)

( * ) Notice: Subject to any disclaimer, the term of this patent is extended or adjusted under 35 U.S.C. 154(b) by 0 days.

(21) Appl. No.: 14/413,141

(22) PCT Filed: Jul. 5, 2013

(86) PCT No.: PCT/FR2013/051601
§ 371 (c)(1),
(2) Date: Jan. 6, 2015

(87) PCT Pub. No.: WO2014/009639
PCT Pub. Date: Jan. 16, 2014

(65) Prior Publication Data
US 2015/0191241 A1  Jul. 9, 2015

(30) Foreign Application Priority Data

Jul. 9, 2012 (FR) ........................ 12 56586

(51) Int. Cl.
*B64C 13/16* (2006.01)
*B64C 13/04* (2006.01)
*B64C 13/12* (2006.01)
*G05D 1/00* (2006.01)

(52) U.S. Cl.
CPC ............. *B64C 13/16* (2013.01); *B64C 13/04* (2013.01); *B64C 13/12* (2013.01); *G05D 1/0077* (2013.01)

(58) Field of Classification Search
CPC ....... B64C 13/16; B64C 13/04; B64C 13/12; G05D 1/0077
USPC ........................................................... 701/3
See application file for complete search history.

(56) References Cited

U.S. PATENT DOCUMENTS

| | | | |
|---|---|---|---|
| 5,291,113 A | 3/1994 | Hegg et al. | |
| 6,000,662 A | 12/1999 | Todeschi et al. | |
| 2004/0078121 A1* | 4/2004 | Cartmell | B64C 13/503 701/3 |
| 2005/0080495 A1* | 4/2005 | Tessier | B64C 13/04 700/63 |
| 2010/0305780 A1* | 12/2010 | Sataka | B64C 13/12 701/3 |
| 2011/0112705 A1* | 5/2011 | Antraygue | B64C 13/12 701/3 |

FOREIGN PATENT DOCUMENTS

| | | |
|---|---|---|
| EP | 0 835 802 A1 | 4/1998 |
| EP | 2 052 966 A2 | 4/2009 |
| FR | 2 952 448 A1 | 5/2011 |
| GB | 2 482 407 A | 2/2012 |
| WO | 03/040844 A2 | 5/2003 |

OTHER PUBLICATIONS

International Search Report, dated Jan. 20, 2014, from corresponding PCT application.

* cited by examiner

*Primary Examiner* — Aaron L Troost
(74) *Attorney, Agent, or Firm* — Young & Thompson

(57) ABSTRACT

A device for combining force between two control units includes force feedback, each control unit including a control stick (21, 31) and at least one force sensor (24, 34) suitable for providing a value of the control force (Fp, Fcp) exerted by a pilot, the device being suitable for forming a force feedback value from the sum of the values of the control forces of each control unit. A correction device limits the force feedback value (Fcor_p) according to at least one parameter taken from the absolute value of the control force (Fcp) of the second control unit and the difference between the control force values of each control unit. A control unit including such a device for combining forces, and an aircraft provided with such control units are also described.

17 Claims, 3 Drawing Sheets

DEVICE FOR COMBINING FORCE AMONG CONTROL UNITS, CONTROL UNIT AND AIRCRAFT

BACKGROUND OF THE INVENTION

1. Field of the Invention

The invention relates to an effort coupling device for effort coupling between at least two piloting members of an aircraft comprising a piloting device equipped, for each flying member of the aircraft, with two such piloting members connected (by a completely mechanical kinematic chain or at least partly electrically) to this flying member, so that the aircraft can be piloted simultaneously by two people: a captain (or pilot) and a copilot.

Throughout the text, the term "piloting" and its derivatives denote, unless otherwise stated, the flying of an aircraft by at least one human pilot operating at least one piloting member such as a stick, handle, rudder bar, pedal, etc., connected to at least one flying member such as a control surface or a throttle control of the aircraft. Furthermore, the term "effort" is employed to denote equally well a torque or a force, according to the arrangement on which this effort is exerted (torque if it involves a rotation or force if it involves a translation).

2. Description of the Related Art

When an aircraft is to be piloted simultaneously by a pilot and a copilot, it is known to connect the piloting members or sticks of each of the two pilots to one another so that each stick moves in a manner servo-coupled to the other stick and so that each pilot can feel on his stick the effort exerted by the other pilot on his own stick. Traditionally, this effort coupling between the piloting members is carried out by a set of rods or cables mechanically connecting the two piloting members.

However, when the piloting members are of electrical or electronic type, it is necessary to simulate the behaviour of traditional mechanical sticks, for example by means of electric motors. From the document U.S. Pat. No. 5,291,113 there is known a piloting device having a coupling device realising the coupling of the displacements and the forces applied to the sticks of the pilot and the copilot. This piloting device has for each piloting member an operating handle connected to an effort sensor (in the form of a torque sensor) and a position sensor. Each torque sensor delivers a signal representing the torque exerted/felt by the pilot (and the copilot, respectively) on the operating handle. From the position signal delivered by the position sensor and an effort feedback value formed of the sum of the torque signals, a summer forms a torque error which is then applied to an electronic controller which delivers an appropriate control electric current to an electric motor in order to correct this torque error and modify the torque felt by the pilot (and the copilot, respectively).

Such an effort coupling device has the disadvantage of degrading the effort sensations of the pilot, on simulating a connection comparable to a rigid rod between the piloting members of the pilot and the copilot. Such a rod is normally accompanied, in mechanical systems, by devices which separate the sticks of the pilots when the effort generated by one on the other exceeds a predetermined limit. Such a "disconnection" is not achieved in the coupling device of the prior art and a limitation of the efforts is achieved only when the coupled efforts of the pilot and the copilot lead to saturation of the electric current supplied to the motor. In this case, the effort supplied by the motor against the effort of the pilot is constant and no longer enables the latter to feel his position with respect to the overall travel of the stick. Likewise, if effort variation laws such as sensations similar to surpassable notches or stops (for example vibrations induced by a stick vibrator for tactile alerting of a situation close to stalling) were provided as a function of the position, these are "erased" by the saturation of the control of the electric motor.

BRIEF SUMMARY OF THE INVENTION

The invention aims to provide a coupling device for coupling between piloting members which does not have the disadvantages of the prior art.

The invention likewise aims to provide such a device which makes it possible to achieve a "disconnection" between the sticks of the pilot and the copilot when the effort generated by one on the other exceeds a predetermined limit.

The invention also aims to enable better dynamics of the piloting member by preserving sufficiently high limits for the saturation of the control of the electric motor.

The invention further aims to provide such a coupling device which makes it possible to take account of the existence of passive return devices, such as springs and/or dampers, connected to the operating handle of the piloting member in parallel with the active devices (motors, various actuators, etc.)

To this end, the invention relates to an effort coupling device for effort coupling between a first effort feedback piloting member and a second effort feedback piloting member, each piloting member having an operating handle movable with respect to a frame and at least one effort sensor adapted to supply a value of an effort, called piloting effort, exerted by a pilot on the operating handle, said device being adapted to form an effort feedback value from the sum of the values of the piloting efforts of each piloting member, characterised in that it further comprises a correcting device adapted to limit said effort feedback value as a function of at least one parameter taken from among the absolute value of the piloting effort of said second piloting member and the difference between the piloting effort values of each piloting member.

By thus introducing a correction of the effort feedback value, either as a function of the difference between the piloting efforts of each piloting member, or as a function of the absolute value of the piloting effort of the second member, it is possible to limit the influence of the values of the piloting efforts supplied by the other piloting members on the piloting effort of a given piloting member. In particular, in a piloting device having two piloting members, for example one stick for the captain (pilot's stick) and one stick for the copilot (copilot's stick), if the copilot's stick is jammed for any reason, or if the pilot and the copilot actuate their respective stick in opposite directions, the correction of the effort feedback as a function of the difference, which is then large, between the piloting effort of the pilot and that of the copilot, introduces a form of elasticity into the connection, which in principle is rigid between the two sticks. Likewise, by limiting the absolute value of the effort of the copilot transmitted to the pilot's stick, it is possible to preserve in the piloting effort of the pilot an effort component calculated as a function of the flight conditions, for example of the position of the stick, without masking the possible surpassable stops (for example vibrations induced by a stick vibrator for tactile alerting of a situation close to stalling) and other tactile sensations representing a particular state or situation which, in the absence of this limitation, would have disappeared owing to the saturation of the current supplied to the electric motor.

Advantageously and according to the invention, the correcting device comprises at least:
- a comparator adapted to obtain a difference of the piloting effort values of each piloting member
- a deadband corrector adapted to supply a correction value of substantially zero if said effort difference is less than a predetermined threshold or a correction value substantially equal to the absolute value of the effort difference, reduced by the threshold value and assigned the sign of the difference when said difference is greater than said predetermined threshold, and
- a summer for forming the effort feedback value from the sum of the piloting efforts and the correction value.

By virtue of the deadband of the corrector, which provides a range of insensitivity to the difference in piloting effort between each piloting member, when the difference in piloting effort is less than the predetermined threshold, the coupling device of the invention behaves as if a rigid connection existed between the sticks of the piloting members. When the difference of the piloting efforts is greater than the threshold, the device behaves, for the piloting member in question, as a limiter of the piloting effort transmitted by the other piloting member(s) and thus introduces a possibility of angular variation between the different sticks of the piloting members.

Advantageously and according to the invention, the predetermined threshold is equal to twice an admissible disconnection effort limit value. This admissible disconnection effort corresponds, in a conventional mechanical system, to the force from which the two sticks of the pilot and the copilot are no longer rigidly connected to one another. Consequently, when the gain of the correction as a function of the difference is equal to one, the influence of the piloting efforts coming from the second piloting member is limited to the admissible disconnection effort and the piloting effort exerted/felt by the pilot corresponds substantially to half of the effort which he would have felt if he were piloting alone, plus a fixed effort equal to the limit value of the admissible disconnection effort, informing him of an anomaly between the two sticks.

Advantageously and according to the invention, the predetermined threshold is variable as a function of a difference between signals representing a position of the operating handle of each piloting member. In this variant of the coupling device according to the invention, the admissible disconnection effort is then variable as a function of the difference in position between the sticks of the pilot and that of the copilot. The greater the difference in position, the higher the disconnection limit effort will be.

Advantageously and according to the invention, the correcting device further has a threshold comparator at the output of the deadband corrector adapted to supply a disconnection signal when the output of the corrector is not zero. In this way, the disconnection signal between the pilots' sticks no longer depends on the current circulating in the electric motor of the piloting member, liable to be affected by highly dynamic movements, and thus enables a reliable disconnection signal.

Advantageously and according to the invention, in a second embodiment of the coupling device of the invention, the correction device comprises at least one saturator adapted to limit the piloting effort value of the second member to an admissible disconnection effort limit value. This embodiment, which is simpler and more economical than the previous one, still makes it possible to fulfil most of the functions allocated to an effort coupling device. That said, in this second embodiment, the two piloting members (pilot and copilot) are not necessarily saturated at the same time, and the detection of the uncoupling takes place only on a single piloting member (except for also monitoring the saturation of the effort of said first piloting member, in addition to that of said second piloting member).

Advantageously and according to the invention, said admissible disconnection effort limit value is variable and said correcting device is adapted to determine said admissible disconnection effort limit value as a function of a difference between signals representing a position of the operating handle of each piloting member.

Advantageously and according to the invention, the correcting device further comprises a comparator adapted to obtain a difference between the piloting effort value of the second member and the output value of the saturator and supply a disconnection signal when this difference is not zero. The difference between the input and the output of the saturator is zero as long as the saturator does not intervene to limit the piloting effort of the copilot. As soon as the limitation occurs, the difference is not zero and a signal representing the disconnection between the two sticks is emitted.

Advantageously and according to the invention, whatever the embodiment of the invention, the effort coupling device has an output adapted to control a disconnection indicator when the disconnection signal is activated. This indicator may be visual (indicator light), acoustic or in the form of a warning displayed on a screen in front of the pilots.

Advantageously and according to the invention, the coupling device further has a counter, activated by the disconnection signal, adapted to open a switch making it possible to isolate the first piloting member from the piloting effort signal of the second piloting member after a predetermined duration. Thus, for example in the event of a jamming of the stick of one of the piloting members, this stick is disconnected from the coupling device and enables independent piloting on the remaining piloting member.

The invention also covers a piloting member adapted to be associated with a second piloting member of the same type, having at least:
- an operating handle movable with at least one degree of freedom,
- an effort sensor adapted to supply a value of an effort, called piloting effort, exerted by a pilot on the operating handle,
- a position sensor adapted to supply a position signal of the operating handle,
- a computer adapted to:
    - calculate, from the position signal, a value of a theoretical control effort, called control effort,
    - form an effort feedback value from the piloting effort value and from a piloting effort value supplied by the associated piloting member,
    - form an effort error value from the control effort and said effort feedback value,
    - control from said effort error value an actuator adapted to modulate the piloting effort, characterised in that the computer comprises a correcting device for correcting the effort feedback value adapted to limit said effort feedback value as a function of the difference between the piloting efforts of each piloting member. A piloting member according to the invention therefore comprises an effort coupling device according to the invention for effort coupling with a second piloting member. By integrating an effort coupling device according to the invention, and more particularly the device for correcting the effort feedback value, in the computer of each piloting member, there is obtained a piloting member which requires only a connection for receiving the piloting effort signal supplied by a second piloting member in order to achieve an effort coupling between the two piloting members. The installation of a piloting device having at least two piloting members is thus greatly simplified compared with an equivalent mechanical device.

The invention also covers an aircraft having a piloting device comprising at least two associated piloting members exhibiting all or part of the features mentioned above or below, in particular comprising an effort coupling device for effort coupling between a first and a second effort feedback piloting member.

The invention also relates to an effort coupling device, a piloting member and an aircraft characterised in combination by all or part of the features mentioned above or below.

BRIEF DESCRIPTION OF THE DRAWINGS

Other objects, features and advantages of the invention will become apparent upon review of the following description and the appended drawings, in which.

DETAILED DESCRIPTION OF THE PREFERRED EMBODIMENTS

Figure 1:
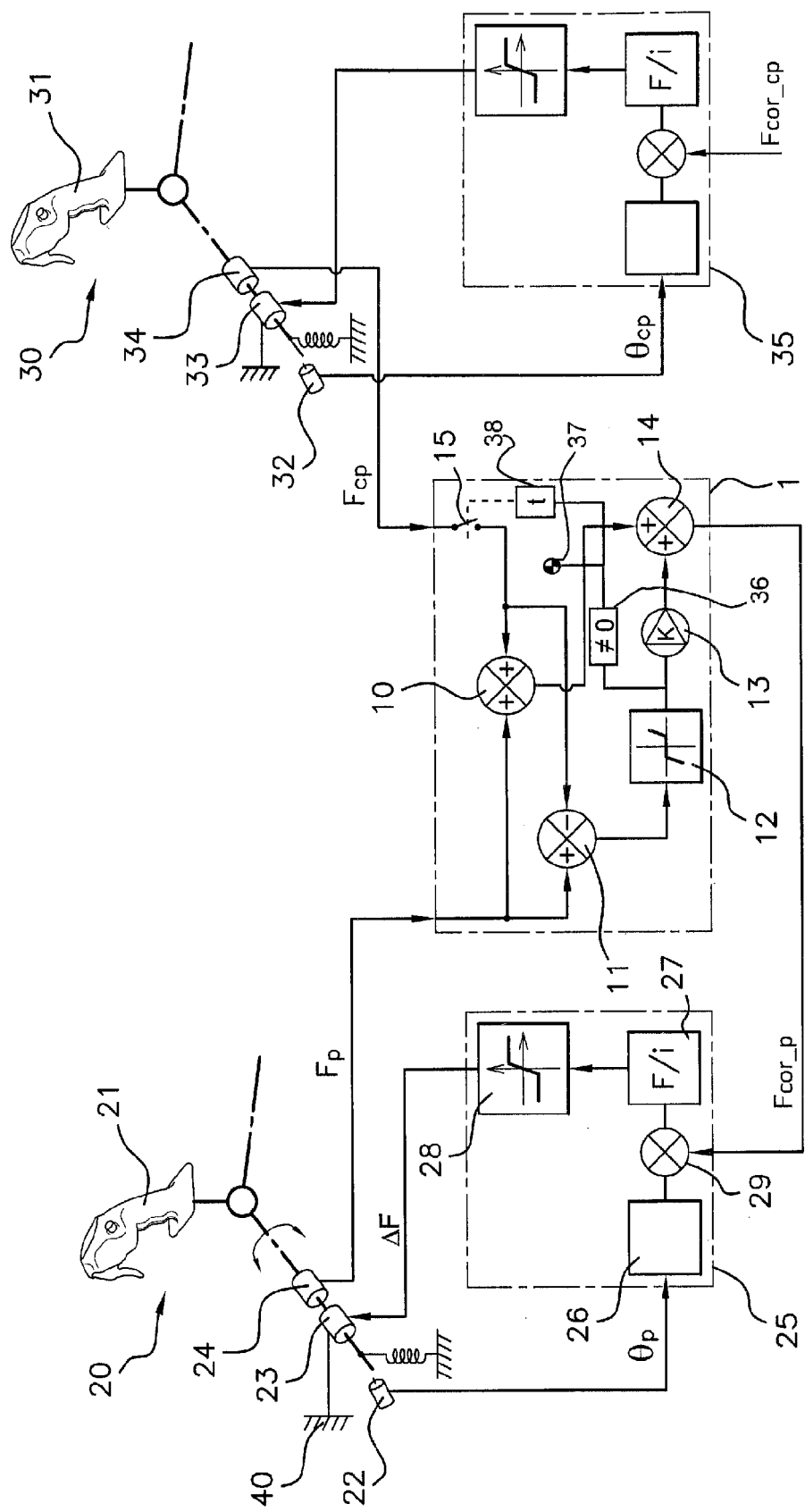
FIG. 1 shows schematically a piloting device comprising two piloting members, at least one of which has an effort coupling device according to a first embodiment of the invention.

Reference is made to FIG. 1, in which two piloting members are shown, in this case aircraft piloting mini-sticks 20 and 30. These mini-sticks have an operating handle 21 (and 31, respectively), each operating handle being adapted to be manipulated by a pilot (and a copilot, respectively). These operating handles are customarily movable in rotation on two concurrent and orthogonal axes, forming a centre-point joint. In the example shown, only one of the two axes, for example the pitch axis, of each piloting member is shown completely, the other axis being able to be deduced therefrom by analogy. In this example, the efforts exerted are efforts relating to a rotation and the term torque will therefore be used to denote it without this being able to be interpreted as a restriction, for example in the case of handles with linear movement where the effort exerted is a force on the translation axis of the handle.

The mini-stick 20, for example dedicated to the pilot (captain) has, in series on the pitch axis, a torque sensor 24, adapted to supply a signal representing the value of the effort, in this case a torque Fp, exerted by the pilot on the operating handle. The torque sensor 24 is connected on the one hand to the operating handle 21 and on the other hand to an electric motor 23 adapted to exert a torque ΔF on the axis of the operating handle. The rotor of the electric motor 23 can be, for example, integral with the pitch axis whereas its stator is connected to the frame 40 of the piloting member. A position sensor 22 is also mounted in series on the pitch axis and enables delivery of a position signal θp, here an angular position signal, of the operating handle. Of course, the axis of the mini-stick can also comprise "passive" elements such as springs or dampers, connected to the frame.

Symmetrically, the mini-stick 30 dedicated to the copilot has an operating handle 31, a torque sensor 34 supplying a signal representing the value of the torque Fcp exerted by the copilot on his operating handle, an electric motor 33 and a position sensor 32 delivering angular position information θcp of the operating handle of the copilot.

In the rest of the text, when parameters refer to the piloting member of the pilot, they will be assigned a suffix p. When the same parameters refer to the piloting member of the copilot, they will be assigned a suffix cp.

The mini-stick 20 of the pilot has computing means 25 comprising a first control block 26 adapted to receive the position signal θp supplied by the position sensor 22 and to supply a theoretical control effort Fcmd_p which should be exerted jointly by the pilots on their respective stick. This theoretical control effort Fcmd_p is transmitted to a summer 29, in which it is compared with an effort feedback Fcor_p delivered by the effort coupling device 1 based on the sum of the piloting efforts Fp and Fcp. How the value of this effort feedback Fcor_p is worked out will be explained in detail below.

The summer 29 therefore delivers a signal corresponding to a torque error to a controller 27, in which this torque error is converted into an electric current suitable for being delivered to the electric motor 23. The output of the controller 27 is transmitted to a saturator 28, in which the current for controlling the electric motor 23 is limited to a predetermined saturation current value. The output of the saturator 28 is delivered in the form of a signal ΔF for controlling the electric motor 23 representing a torque variation to be applied to the pitch axis and therefore to the operating handle 21.

In a first embodiment of the invention, the effort coupling device 1, associated with the mini-stick 20, works out the effort feedback value Fcor_p from the piloting efforts Fp and Fcp coming respectively from the torque sensor 24 of the mini-stick 20 of the pilot and the torque sensor 34 of the mini-stick 30 of the copilot. A summer 10 performs the sum Fp+Fcp and transmits it to a second summer 14.

Figure 3:
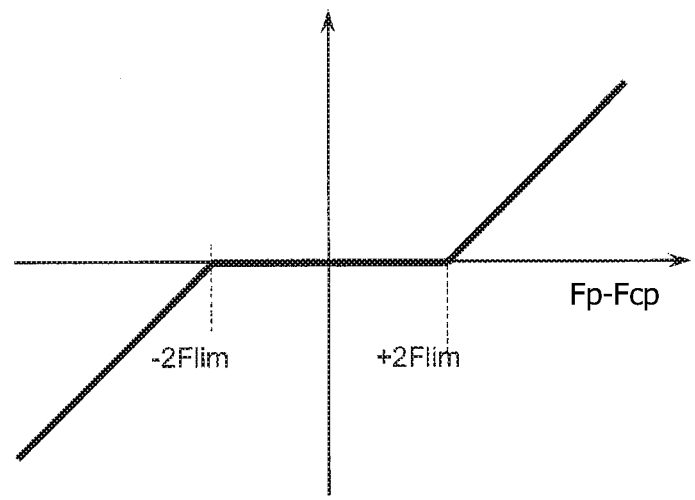
FIG. 3 shows a graph of the transfer function of the deadband corrector employed in the first embodiment of the invention.

The piloting efforts Fp and Fcp are also transmitted to a comparator 11 adapted to obtain the difference between the values of these piloting efforts. The output of the comparator 11 is then transmitted to a deadband corrector 12. The transfer function of this corrector 12 will be better understood in conjunction with the graph of FIG. 3. The difference Fp−Fcp is represented as the abscissa of the graph of FIG. 3 and the output of the corrector 12 corresponds to the ordinate of this graph. The deadband of the corrector 12 extends between a negative threshold $-2F_{lim}$ and a positive threshold $+2F_{lim}$, symmetrical to one another with respect to the origin. The absolute value of each threshold is chosen to be equal to twice a predetermined effort $F_{lim}$ representing an effort, called the admissible disconnection effort, corresponding to the maximum admissible effort exerted by one stick on the other before the two sticks regain relative freedom of displacement with respect to one another. Thus, when the difference Fp−Fcp, as an algebraic value, is in the deadband of the corrector 12, the output of the latter is zero. As soon as the value of the difference Fp−Fcp exceeds either of the thresholds, the output of the corrector 12 is equal to the value of the difference minus the value of the closest threshold.

The output of the corrector 12 is then applied, on the one hand, to an amplifier 13 having a gain K, the output of which is connected to the second input of the second summer 14. The second summer 14 then performs the sum of a correction value of the effort feedback as a function of the difference Fp−Fcp of the piloting efforts applied and of the sum Fp+Fcp of said piloting efforts. The output of the second summer 14 then represents a corrected effort feedback Fcor_p which is then transmitted to the summer 29 of the computing means 25.

When the gain K is equal to 1, the corrected effort feedback Fcor_p is equal to:
- the sum Fp+Fcp of the piloting efforts of the two sticks 20 and 30 if the difference Fp−Fcp is between the two thresholds of the deadband of the corrector 12;
- twice the value of the piloting effort Fp of the pilot minus the value of the closest threshold, i.e. $2(Fp-F_{lim})$ if the piloting effort Fp exerted by the pilot is greater than the piloting effort Fcp exerted by the copilot, or $2(Fp+F_{lim})$ in the opposite case.

The introduction of the corrected effort feedback Fcor_p into the control loop of the electric motor 23 thus makes it possible to obtain for the piloting effort Fp exerted by the pilot:
- Fp=Fcmd_p−Fcp if the difference of the piloting efforts Fp−Fcp of the pilot and of the copilot is less as an absolute value than $2 F_{lim}$
- Fp=½Fcmd_p+$F_{lim}$ if the piloting effort exerted by the pilot is greater than that of the copilot;
- Fp=½Fcmd_p−$F_{lim}$ if the piloting effort exerted by the copilot is greater than that of the pilot.

It can thus be noted that in all cases, the effort exerted by the pilot depends on the theoretical control effort Fcmd_p and that the effort variations introduced into the theoretical control effort thus remain perceptible to the pilot, even when the difference of the piloting efforts between the two sticks is greater than the disconnection limit.

The output of the corrector 12 is applied, on the other hand, to a threshold detector 36 which supplies a disconnection signal when the output of the corrector 12 is not zero. This disconnection signal is then applied to a disconnection indicator 37, which may be an indicator light and/or an alarm bell and/or a warning message on a screen in order to inform the crew of the occurrence of an abnormal difference between the stick of the pilot and that of the copilot.

The disconnection signal is also applied to a counter 38 adapted to count down a predetermined duration and, at the end of this duration, open a switch 15 in order to isolate the effort coupling device 1 from the piloting effort Fcp supplied by the torque sensor 34 of the mini-stick 30. At this time, the mini-stick 20 of the pilot is completely independent of the mini-stick 30.

Of course, in the above description, the effort coupling device of the invention has been described in relation to the mini-stick 20 of the pilot. It is obvious that such a device is completely symmetrical between the mini-stick 20 of the pilot and the mini-stick 30 of the copilot. Consequently, an effort coupling device identical to the device 1, with a respective reversal of the piloting efforts Fp and Fcp is associated with the mini-stick 30 in order to supply a corrected effort feedback Fcor_cp to the summer of the computer 35.

Figure 2:
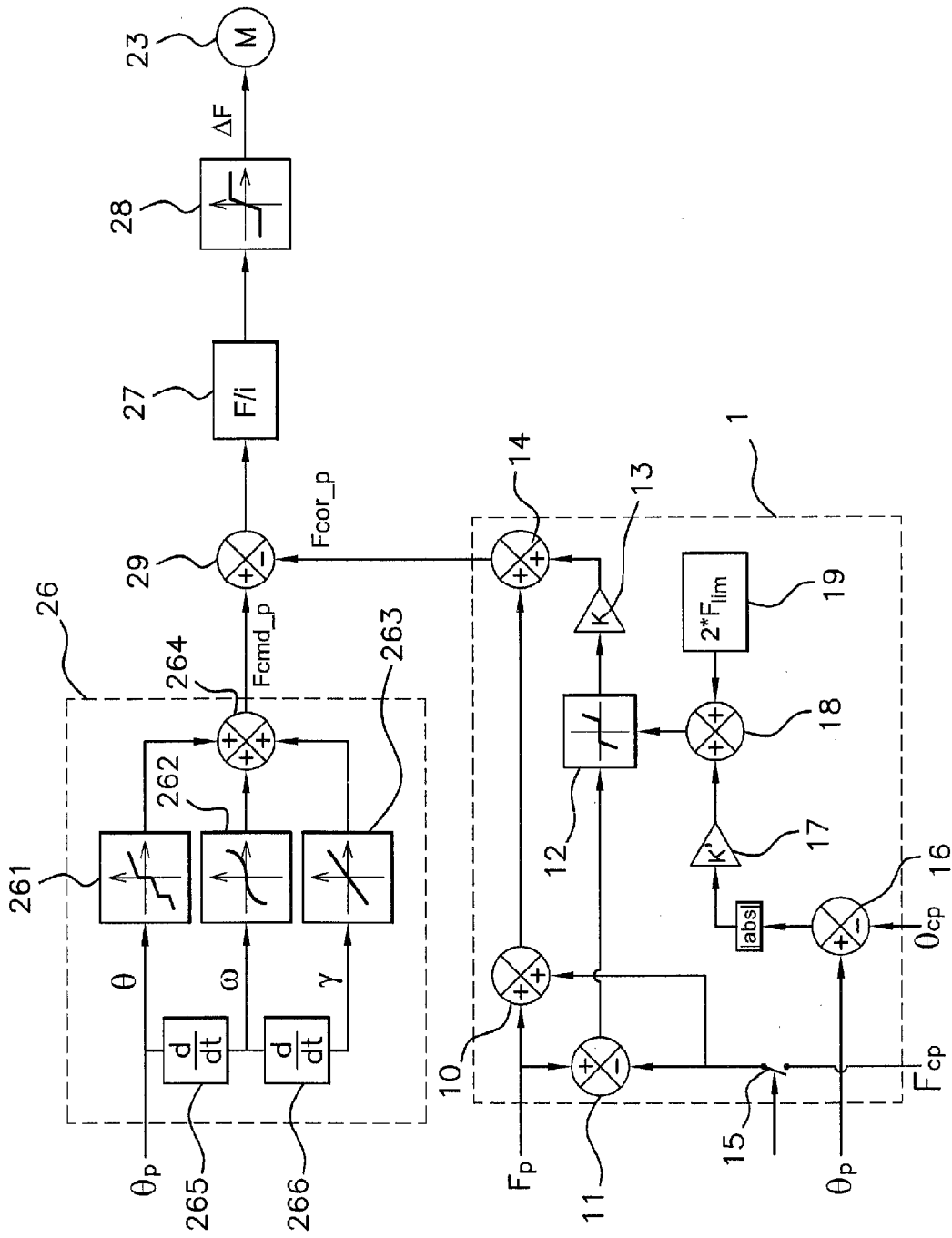
FIG. 2 shows in a more detailed manner a block diagram of the control part of a piloting member having an effort coupling device according to a variant of the first embodiment of the invention.

Reference is now made to FIG. 2 to describe in more detail a variant of the effort coupling device of the invention.

In the following description, the same references are used to denote elements identical to those of FIG. 1.

The control block 26 which receives at the input the position signal θp coming from the position sensor 22 is thus shown in detail. This position signal is directly transmitted to a reference table 261 adapted to supply a first control effort value as a function of the position θp.

The signal θp is also differentiated in a first differentiator 265 for supplying a signal ω corresponding to the displacement speed of the operating handle 21. This signal ω is transmitted to a second reference table 262 adapted to supply an effort value corresponding to a damping effort as a function of the displacement speed of the operating handle.

In the same way, the signal ω is fed to a second differentiator 266 for supplying a signal γ representing the acceleration of the operating handle 21. This signal is then transmitted to the input of a third reference table 263 for obtaining a control effort value corresponding to the inertia of the operating handle 21.

These three control effort values are then added to one another in a summer 264 for supplying a resulting value of the theoretical control effort Fcmd_p.

This theoretical control effort Fcmd_p is then compared with a corrected effort feedback Fcor_p in the summer 29 to determine, after passing through the controller 27 and the saturator 28, the effort correction ΔF to be applied by the electric motor 23.

The corrected effort feedback Fcor_p is worked out in the effort coupling device 1 comprising, like that of FIG. 1, a first summer 10, a comparator 11 for obtaining the difference of the piloting efforts coming from the stick of the pilot and that of the copilot and a deadband corrector 12. The corrector 12 has an additional input making it possible to adjust the threshold values determining the width of the deadband. The effort coupling device 1 also has, in this variant, an input adapted to receive the position signal θp delivered by the position sensor 22 of the mini-stick 20 and an input adapted to receive the position signal θcp of the position sensor 32 of the mini-stick 30. A comparator 16 obtains the difference θp−θcp, the absolute value of which is transmitted to an amplifier 17 of gain K'. The output of the amplifier 17 is transmitted to a summer 18 which receives at its other input a threshold value equal to $2 F_{lim}$ coming from a memory 19. In this way, the output of the summer 18 transmits to the corrector 12 a threshold value of the deadband which is variable as a function of the difference of the position signals supplied by the respective position sensors of each of the mini-sticks 20 and 30.

In this way, the corrected effort feedback Fcor_p is a function on the one hand of the difference between the piloting efforts and on the other hand of the difference between the positions of the operating handles of the mini-sticks of the pilot and of the copilot.

Figure 4:
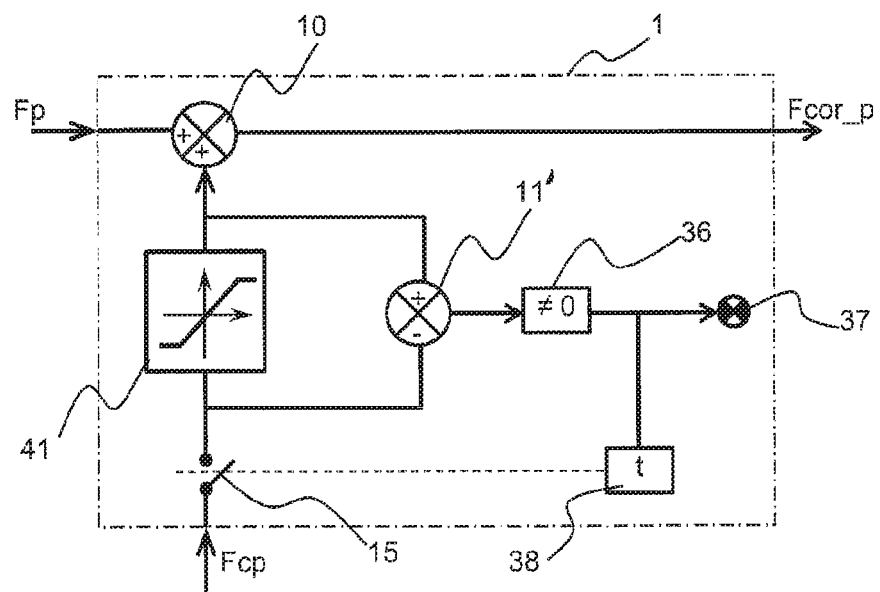
FIG. 4 shows an effort coupling device according to a second embodiment of the invention.

In a second embodiment of the effort coupling device 1 according to the invention, illustrated in FIG. 4, the device 1 has an effort saturator 41 in series between the input of the piloting effort Fcp of the copilot and the summer 10. The effort saturator 41 has limit values provided for limiting the value of the piloting effort Fcp to a value corresponding to the value $F_{lim}$ of the admissible disconnection effort. Thus, the effort feedback Fcor_p is equal to Fp+Fcp if Fcp is less than $F_{lim}$, or equal to Fp+$F_{lim}$ if Fcp is greater than $F_{lim}$.

The effort coupling device 1 further comprises, at the terminals of the saturator 41 and in parallel with the latter, a comparator 11' adapted to obtain the difference between the output of the saturator 41 and the piloting effort Fcp at the input of the latter. This difference is zero if the piloting effort Fcp is less than $F_{lim}$. This difference is supplied to the threshold comparator 36 for generating the disconnection signal suitable for driving the disconnection indicator 37 and the counter 38 in order to open the switch 15 and disconnect the input of the piloting effort Fcp after a predetermined disconnection duration.

The invention also covers a piloting member, such as the mini-stick 20 shown in FIG. 1, in which a computer groups together the functions of the computing means 25 and of the effort coupling device 1 according to the invention. This computer is adapted to calculate from the position signal θp supplied by the position sensor 22 a theoretical control effort value, for example from reference tables of the control effort as a function of the position, the speed and/or the acceleration of the operating handle of this member.

This computer is also adapted to form an effort feedback value Fcor_p from the piloting effort value supplied by the torque sensor 24 and a piloting effort value supplied by an associated piloting member, to calculate an effort error value from the control effort value calculated in the control block 26 and the effort feedback value Fcor_p and to deduce therefrom an effort correction ΔF applicable to the electric motor 23.

According to the invention, this computer further comprises an effort coupling device comprising a device for correcting the effort feedback value as described above.

Of course, this description is given purely by way of illustrative example and a person skilled in the art will be able to make numerous modifications to it without departing from the scope of the invention, such as for example use more than two piloting members, or apply the teaching of the invention to piloting members comprising one or more degrees of freedom.

The invention claimed is:

1. An effort couple device comprising:
   a first input connected to a first effort feedback piloting member (20);
   a second input connected to a second effort feedback piloting member (30),
   each piloting member having i) at least one effort sensor (24, 34) adapted to supply a value of an effort, called piloting effort (Fp, Fcp), exerted by a pilot, and ii) an operating handle (21,31) movable with respect to a frame (40) and with respect to the at least one effort sensor (24, 34) so that the at least one effort sensor (24, 34) supplies a signal representing the value of effort exerted by the pilot on the operating handle to a respective one of the first and second inputs;
   means adapted to form an effort feedback value (Fcor_p) from a sum of the values of the piloting efforts of each piloting member; and
   a correcting device adapted to limit said effort feedback value (Fcor_p) as a function of at least one parameter taken from among the value of the piloting effort (Fcp) of said second piloting member and the difference between the piloting effort values of each piloting member.

2. The device according to claim 1, wherein the correcting device comprises:
   a comparator (11) adapted to obtain a difference (Fp−Fcp) of the piloting effort values of each piloting member
   a deadband corrector (12) adapted to supply a correction value of substantially zero if said effort difference is less than a predetermined threshold ($2F_{lim}$) or a correction value substantially equal to the absolute value of the effort difference, reduced by the threshold value and assigned the sign of the difference when said difference is greater than said predetermined threshold, and
   a summer (14) for forming the effort feedback value (Fcor_p) from the sum (Fp+Fcp) of the piloting efforts and the correction value.

3. The device according to claim 2, wherein the predetermined threshold is equal to twice an admissible disconnection effort limit value ($F_{lim}$).

4. The device according to claim 3, wherein the correcting device further comprises a threshold comparator (36) at the output of the deadband corrector (12) adapted to supply a disconnection signal when the output of the corrector is not zero.

5. The device according to claim 2, wherein the predetermined threshold is variable as a function of a difference between signals (θp, θcp) representing a position of the operating handle of each piloting member.

6. The device according to claim 5, wherein the correcting device further comprises a threshold comparator (36) at the output of the deadband corrector (12) adapted to supply a disconnection signal when the output of the corrector is not zero.

7. The device according to claim 2, wherein the correcting device further has a threshold comparator (36) at the output of the deadband corrector (12) adapted to supply a disconnection signal when the output of the corrector is not zero.

8. The device according to claim 7, further comprising an output adapted to control a disconnection indicator (37) when the disconnection signal is activated.

9. The device according to claim 7, further comprising a counter (38), activated by the disconnection signal, adapted to open a switch (15) making it possible to isolate the first piloting member (20) from the piloting effort signal (Fcp) of the second piloting member (30) after a predetermined duration (t).

10. The device according to claim 1, wherein the correction device comprises at least one saturator (41) adapted to limit the piloting effort value (Fcp) of the second member to an admissible disconnection effort limit value ($F_{lim}$).

11. The device according to claim 10, wherein correcting device is adapted to determine said admissible disconnection effort limit value ($F_{lim}$) as a function of a difference between signals (θp, θcp) representing a position of the operating handle of each piloting member.

12. The device according to claim 11, wherein the correcting device further comprises a comparator (11') adapted to obtain a difference between the piloting effort value (Fcp) of the second member and the output value of the saturator (41) and supply a disconnection signal when this difference is not zero.

13. The device according to claim 10, wherein the correcting device further comprises a comparator (11') adapted to obtain a difference between the piloting effort value (Fcp) of the second member and the output value of the saturator (41) and supply a disconnection signal when this difference is not zero.

14. The device according to claim 13, further comprising an output adapted to control a disconnection indicator (37) when the disconnection signal is activated.

15. The device according to claim 13, further comprising a counter (38), activated by the disconnection signal, adapted to open a switch (15) making it possible to isolate the first piloting member (20) from the piloting effort signal (Fcp) of the second piloting member (30) after a predetermined duration (t).

16. Piloting member (20) adapted to be associated with a second piloting member (30) of the same type, comprising:
- an operating handle (21) movable with at least one degree of freedom,
- an effort sensor (24) adapted to supply a value of an effort, called piloting effort (Fp), exerted by a pilot on the operating handle,
- a position sensor (22) adapted to supply a position signal ($\theta$p) of the operating handle,
- a computer adapted to:
  - calculate, from the position signal, a value of a theoretical control effort, called control effort (Fcmd_p),
  - form an effort feedback value (Fcor_p) from the piloting effort value (Fp) and from a piloting effort value (Fcp) supplied by the associated piloting member (30),
  - form an effort error value ($\Delta$F) from the control effort and said effort feedback value,
  - control from said effort error value an actuator (23) adapted to modulate the piloting effort (Fp),
- wherein the computer comprises a correcting device for correcting the effort feedback value (Fcor_p) adapted to limit said effort feedback value as a function of at least one parameter taken from among the value of the piloting effort (Fcp) of said second piloting member and the difference (Fp−Fcp) between the values of the piloting efforts of each piloting member.

17. An aircraft having a piloting device comprising at least associated first and second piloting members, each of the associated first and second piloting members comprising:
- an operating handle (21) movable with at least one degree of freedom,
- an effort sensor (24) adapted to supply a value of an effort, called piloting effort (Fp), exerted by a pilot on the operating handle,
- a position sensor (22) adapted to supply a position signal ($\theta$p) of the operating handle, and
- a computer adapted to:
  - i) calculate, from the position signal, a value of a theoretical control effort, called control effort (Fcmd_p),
  - ii) form an effort feedback value (Fcor_p) from the piloting effort value (Fp) and from a piloting effort value (Fcp) supplied by the associated piloting member (30),
  - iii) form an effort error value ($\Delta$F) from the control effort and said effort feedback value, and
  - iv) control from said effort error value an actuator (23) adapted to modulate the piloting effort (Fp),
- wherein the computer comprises a correcting device for correcting the effort feedback value (Fcor_p) adapted to limit said effort feedback value as a function of at least one parameter taken from among the value of the piloting effort (Fcp) of said second piloting member and the difference (Fp−Fcp) between the values of the piloting efforts of each piloting member.

* * * * *